(12) United States Patent
Jeong

(10) Patent No.: US 10,946,893 B2
(45) Date of Patent: Mar. 16, 2021

(54) APPARATUS AND METHOD FOR DETECTING MOTOR FAILURE

(71) Applicant: MANDO CORPORATION, Pyeongtaek-si (KR)

(72) Inventor: Yeong Jin Jeong, Gwangju-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 203 days.

(21) Appl. No.: 16/146,281

(22) Filed: Sep. 28, 2018

(65) Prior Publication Data
US 2019/0100239 A1 Apr. 4, 2019

(30) Foreign Application Priority Data
Sep. 29, 2017 (KR) .......................... 10-2017-0127055

(51) Int. Cl.
*B62D 5/04* (2006.01)
*H02P 6/12* (2006.01)
*H02P 29/024* (2016.01)

(52) U.S. Cl.
CPC ......... *B62D 5/0487* (2013.01); *B62D 5/0481* (2013.01); *B62D 5/0484* (2013.01); *H02P 6/12* (2013.01); *H02P 29/0241* (2016.02); *H02P 2205/05* (2013.01)

(58) Field of Classification Search
CPC .. B62D 5/0487; B62D 5/0481; B62D 5/0484; H02P 29/0241; H02P 6/12; H02P 2205/05
See application file for complete search history.

(56) References Cited

U.S. PATENT DOCUMENTS

| 2003/0222612 | A1* | 12/2003 | Matsushita | ............... H02P 6/34 318/437 |
| 2009/0240389 | A1* | 9/2009 | Nomura | ................... H02P 6/16 701/31.4 |
| 2016/0200353 | A1* | 7/2016 | Sasaki | .................... B62D 5/049 701/43 |

FOREIGN PATENT DOCUMENTS

| JP | 2016-113031 A | 6/2016 |
| KR | 10-0590691 B1 | 6/2006 |
| KR | 10-2009-0027494 A | 3/2009 |

(Continued)

OTHER PUBLICATIONS

Korean Notice of Allowance dated Sep. 13, 2018 issued in Korean Patent Application No. 10-2017-0127055.

*Primary Examiner* — Aaron L Troost
(74) *Attorney, Agent, or Firm* — Morgan, Lewis & Bockius LLP

(57) ABSTRACT

The present disclosure relates to an apparatus and method for detecting a motor failure capable of detecting a motor failure using a position sensor and, when a motor failure is not detected using the position sensor, detecting a motor failure using a torque sensor. An apparatus for detecting a motor failure according to an embodiment of the present disclosure includes a plurality of position sensors each configured to output signals related to a position of a motor, a torque sensor configured to detect torque of the motor according to rotation of a steering wheel, and a failure detector configured to, when all of the signals related to the position of the motor which have been output from the plurality of position sensors indicate that the motor is stuck, detect whether the motor has failed by using a variation of the torque of the motor.

16 Claims, 4 Drawing Sheets

(56) References Cited

FOREIGN PATENT DOCUMENTS

KR  10-2015-0066699 A  6/2015

* cited by examiner

APPARATUS AND METHOD FOR DETECTING MOTOR FAILURE

CROSS REFERENCE TO RELATED APPLICATION

This application claims priority from Korean Patent Application No. 10-2017-0127055, filed on Sep. 29, 2017, which is hereby incorporated by reference for all purposes as if fully set forth herein.

BACKGROUND OF THE INVENTION

1. Field of the Invention

The present disclosure relates to an apparatus and method for detecting a motor failure, and more particularly, to an apparatus and method for detecting a motor failure capable of detecting a motor failure using a position sensor and, when a motor failure is not detected using the position sensor, detecting a motor failure using a torque sensor.

2. Description of the Prior Art

An electric steering control method refers to a steering control method using an auxiliary steering force generator (e.g., a motor) for assisting a steering force of a driver. As an example, the electric steering control method refers to a system which, when a driver operates a steering wheel, measures a steering torque of the driver, calculates an auxiliary steering force corresponding thereto, and provides the auxiliary steering force using a motor.

Such an electric steering control method helps the driver perform steering with a small force and provides auxiliary steering forces of various magnitudes according to a vehicle speed, thereby preventing an accident due to sudden steering at a high speed.

Therefore, for accurate steering control, accurately measuring whether a motor has failed is most important.

However, in case of a situation in which the reliability of motor failure detection is not guaranteed due to a failure of a position sensor configured to measure a steering torque of a driver, a situation in which the driver is unable to control the vehicle due to a motor stuck phenomenon may occur, and a severe car accident may be caused.

PRIOR-ART DOCUMENT

Patent Document

Korean Patent Registration No. 10-1166945 (Registration date: Jul. 12, 2012)

SUMMARY OF THE INVENTION

The present disclosure has been devised to solve the above-described problems, and it is an object of the present disclosure to provide an apparatus and method for detecting a motor failure capable of detecting a motor failure using a motor position sensor and a torque sensor.

In addition, it is an object of the present disclosure to provide an apparatus and method for detecting a motor failure capable of detecting a motor failure using a torque sensor when a motor position sensor malfunctions.

Features and advantages of the present disclosure other than the above-mentioned objects of the present disclosure may be described below or may be clearly understood by those of ordinary skill in the art to which the present disclosure pertains from descriptions below.

To achieve the above-described objects, an apparatus for detecting a motor failure according to an embodiment of the present disclosure includes a plurality of position sensors each configured to output signals related to a position of a motor, a torque sensor configured to detect torque of the motor according to rotation of a steering wheel, and a failure detector configured to, when all of the signals related to the position of the motor which have been output from the plurality of position sensors indicate that the motor is stuck, detect whether the motor has failed by using a variation of the torque of the motor.

To achieve the above-described objects, a method for detecting a motor failure according to an embodiment of the present disclosure includes detecting signals related to a position of a motor by using a plurality of position sensors, detecting whether all of the signals detected by the position sensors indicate that the motor is stuck, and detecting whether the motor has failed on the basis of a steering variation and a variation of torque detected using a torque sensor.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
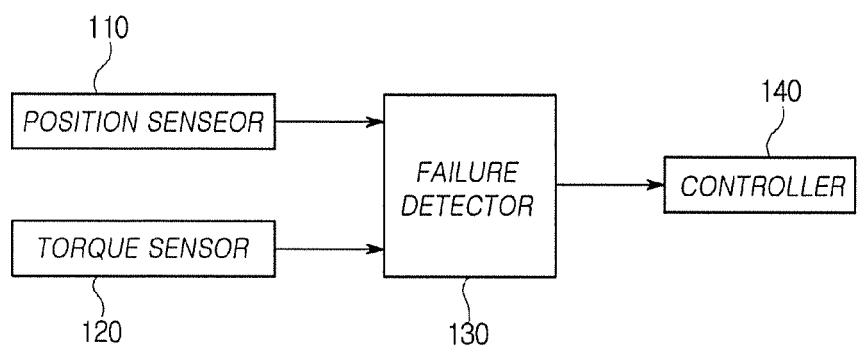
FIG. 1 is a view illustrating a motor failure detecting apparatus according to an embodiment of the present disclosure.

Hereinafter, exemplary embodiments of the present disclosure will be described in detail with reference to the accompanying drawings so that those of ordinary skill in the art to which the present disclosure pertains are able to easily practice the present disclosure. The present disclosure may be implemented in various different forms and thus is not limited to the embodiments described herein.

To clearly describe the present disclosure, detailed description of parts irrelevant to the essence of the present disclosure may be omitted, and like or similar elements may be denoted by like reference numerals throughout the specification.

When a certain part is described as "including" a certain element, this signifies that the certain part may also include another element rather than excluding the other element unless particularly described otherwise. Technical terms used herein are merely used for mentioning specific embodiments and are not intended to limit the present disclosure. The technical terms may be interpreted as concepts understood by those of ordinary skill in the art to which the present disclosure pertains unless defined otherwise herein.

FIG. 1 is a view illustrating a motor failure detecting apparatus according to an embodiment of the present disclosure.

Referring to FIG. 1, a motor failure detecting apparatus 100 according to an embodiment of the present disclosure includes a position sensor 110, a torque sensor 120, a failure detector 130, and a controller 140.

The position sensor 110 may measure the amount of rotation of a motor during rotation of the motor. That is, the position sensor 110 is capable of detecting a rotary position of the motor and outputs a signal related to the rotary position of the motor. Specifically, the position sensor 110 is mounted on the motor, detects the rotary position of the motor, and outputs a signal corresponding thereto. Here, the motor may rotate according to rotation of a steering wheel, and accordingly, the position sensor 110 may show the position of the motor as a phase. In this case, a plurality of position sensors 110 may be mounted on the motor, detect the position of the motor at predetermined intervals, and output signals according to phases.

The torque sensor 120 detects torque of the motor according to rotation of the steering wheel. The torque of the motor may refer to torque applied to the motor in response to the rotation of the steering wheel. Specifically, the torque sensor 120 is coupled to an upper end of an input shaft of the steering wheel that a driver operates. A lower end of the input shaft of the steering wheel is connected to an upper end of an output shaft by a torsion bar, and a lower end of the output shaft is connected to a wheel. Here, when the driver operates the steering wheel, a rotary force is transmitted to the input shaft, and the torsion bar is rotated due to the rotary force of the input shaft. In this case, since the torsion bar is connected to the output shaft, the rotary force is also transmitted to the output shaft such that the wheel may rotate in a direction in which the driver has operated the steering wheel. The torque sensor 120 detects a torsion angle of the torsion bar that rotates due to the rotary force of the input shaft. Therefore, the degree to which the steering wheel has been rotated may be detected according to the torsion angle of the torsion bar detected by the torque sensor 120. In addition, the torque sensor 120 may periodically detect torque of the motor.

The failure detector 130 may detect whether there is a measurement error of the position sensor 110 and whether the motor is stuck, on the basis of signals related to the rotary position of the motor which have been output from the plurality of position sensors 110 and a variation of torque measured by the torque sensor 120. When different signals are output from the plurality of position sensors 110, the failure detector 130 may detect that there is an error in measurement values of the position sensors 110. For example, when one position sensor detects the amount of rotation of the motor while another position sensor detects that the motor is stuck, the failure detector 130 may detect that there is an error in measurements of the position sensors 110.

Here, when all of the position sensors 110 detect the amount of rotation of the motor and the amounts of rotation of the motor detected by the position sensors 110 are the same, the failure detector 130 may detect that there is no error in the position sensors 110 and, accordingly, detect the motor as normal.

In addition, when all of the signals related to the position of the motor which have been output from the plurality of position sensors 110 indicate that the motor is stuck, the failure detector 130 changes steering of a vehicle clockwise or counterclockwise, detects whether the vehicle has moved according to a variation of the torque of the motor and a variation of the steering, and detects whether the motor is stuck.

Here, when at least one of the signals related to the position of the motor which have been output from the plurality of position sensors 110 indicate that the motor is stuck, since the accuracy of the rotary position of the motor detected by the position sensors 110 decreases and the accuracy in detecting whether the motor has failed also decreases, the failure detector 130 may detect whether the motor has failed by using a variation of the torque of the motor.

Specifically, when all of the signals related to the position of the motor which have been output from the plurality of position sensors 110 indicate that the motor is stuck, the failure detector 130 rotates the steering wheel in a first direction and senses a variation of the torque of the motor.

Here, when a variation of the torque of the motor is not sensed, this may be a case in which the motor has not rotated despite rotation of the steering wheel, and the failure detector 130 may detect that the motor or any one configuration for connecting the motor and the steering wheel has failed.

Meanwhile, when a variation of the torque of the motor is sensed, this is a case in which the motor has rotated according to rotation of the steering wheel, and the failure detector 130 may detect whether the motor has failed by detecting whether the vehicle normally moves in a direction of rotation of the steering wheel. That is, the failure detector 130 detects whether the vehicle moves in the first direction.

Here, when the vehicle moves in the first direction, this is a case in which the vehicle has normally moved in the direction of rotation of the steering wheel, and the failure detector 130 may detect the motor as normal.

Meanwhile, when the vehicle does not move in the first direction, the failure detector 130 detects whether the vehicle moves in a second direction which is opposite the first direction. Here, the vehicle may be unable to move in the first direction due to an obstacle or the like, and to prevent this from being erroneously detected as a failure of the motor, the failure detector 130 may detect whether the vehicle is movable in the second direction which is opposite the first direction. In this case, the failure detector 130 may rotate the steering wheel in the second direction and allow the vehicle to move in the second direction.

Here, when the vehicle moves in the second direction, since this is a case in which the vehicle has normally moved in the direction of rotation of the steering wheel, the failure detector 130 may detect the motor as normal.

Meanwhile, when the vehicle does not move in the second direction, the failure detector 130 detects that the motor has failed. Here, the failure detector 130 may detect that the vehicle is unable to move due to the failure of the motor instead of an obstacle or the like.

The controller 140 controls the vehicle on the basis of the detection of the failure detector 130. Specifically, when the motor is detected as normal, the controller 140 may control a steering device, a braking device, a suspension device, and the like such that the vehicle travels according to the driver's instructions.

Meanwhile, when the motor is detected as having failed, the controller 140 cuts off a power supply of the vehicle. Here, the controller 140 may cut off the power supply of the vehicle and release the stuck motor. Therefore, the controller 140 may cut off the power supply of the vehicle so that the stuck motor is released, and the driver may move the vehicle to a safe location using the power remaining after the power supply is cut off. An accident that may occur due to being unable to change steering of the vehicle may be prevented by the motor failure detecting apparatus 100 according to an embodiment of the present disclosure.

Figure 2:
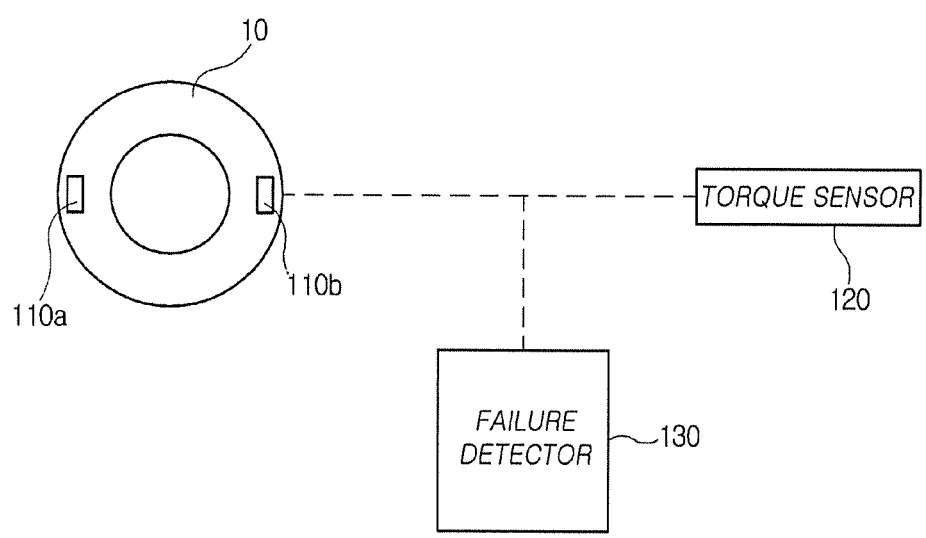
FIG. 2 is a view illustrating a position at which a position sensor is mounted on a motor.

FIG. 2 is a view illustrating a position at which a position sensor is mounted on a motor.

Referring to FIGS. 1 and 2, the position sensors 110 are mounted on a motor 10 and detect the position of the motor 10. A magnet (not illustrated) may be mounted on one end of a rotor of the motor 10, and the position sensors 110 may sense rotation of the magnet and determine an angle of rotation of the motor 10. As the magnet, a plurality of magnets are disposed in a circumferential direction, that is, a plurality of N-poles and S-poles are alternately disposed. The angle of rotation of the motor 10 may be more accurately determined as the number of N-poles and S-poles is greater. The position sensors 110 may sense rotation of the magnet installed at one end of the rotor of the motor 10 and determine a speed of rotation and the angle of rotation of the motor 10. Accordingly, the motor 10 may rotate according to rotation of the steering wheel, and the plurality of position sensors 110 may output signals related to the position of the motor 10 that changes according to the rotation of the motor.

Here, the failure detector 130 may detect whether the motor has failed by using the signals related to the position of the motor which have been output from the position sensors 110.

For example, when a first position sensor 110*a* has detected the amount of rotation of the motor and a second position sensor 110*b* has detected the amount of rotation of the motor, the failure detector 130 may detect whether the signals related to the position of the motor which have been output from the first position sensor 110*a* and the second position sensor 110*b* correspond to the speed of rotation and the angle of rotation of the motor 10. That is, the failure detector 130 may detect whether the first position sensor 110*a* and the second position sensor 110*b* have accurately detected the actual amount of rotation of the motor. Here, when the first position sensor 110*a* and the second position sensor 110*b* have detected the actual amount of rotation of the motor, the failure detector 130 detects the motor as normal.

As another example, when the first position sensor 110*a* has detected the amount of rotation of the motor while the second position sensor 110*b* has not detected the amount of rotation of the motor, that is, the second position sensor 110*b* has detected that the motor is stuck, the failure detector 130 may detect the position sensors 110 as abnormal. Here, when the second sensor 110*b* has detected that the motor is stuck, this may be due to a failure of the second position sensor 110*b* or an output error that occurs temporarily. In such cases, accuracy of the rotary position of the motor may decrease.

As still another example, when the first position sensor 110*a* has not detected the amount of rotation of the motor and the second position sensor 110*b* has not detected the amount of rotation of the motor, that is, when the first position sensor 110*a* and the second position sensor 110*b* have detected that the motor is stuck, the failure detector 130 may detect whether the motor has failed by using the torque sensor 120. Here, when both the first position sensor 110*a* and the second position sensor 110*b* have detected that the motor is stuck, whether the motor has not rotated due to the absence of torque applied to the motor or due to the failure of the motor may not be accurately determined. Therefore, the failure detector 130 may detect whether the motor has failed by using a variation of the torque of the motor detected by the torque sensor 120.

Figure 3:
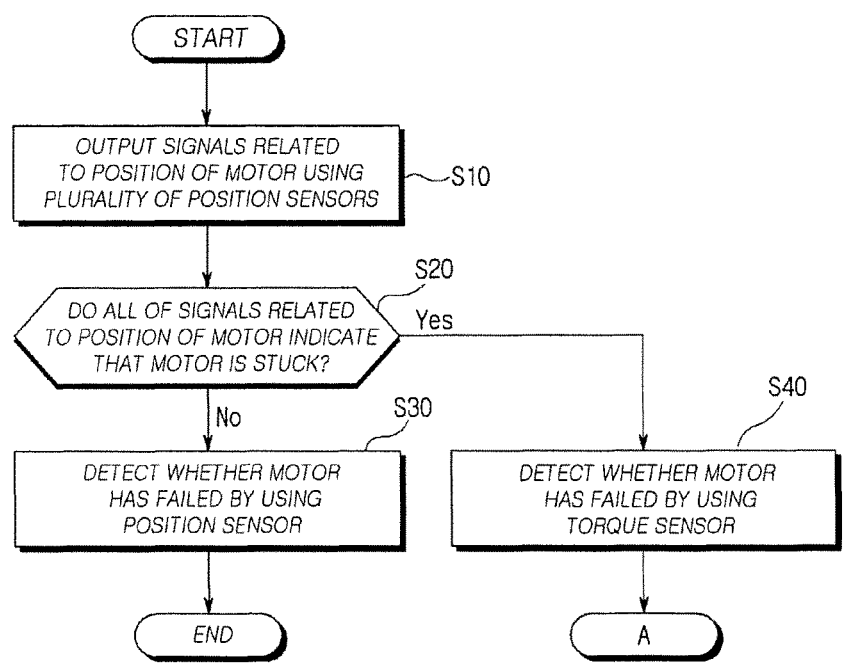
FIG. 3 is a flowchart of a motor failure detecting method using a position sensor according to an embodiment of the present disclosure.

FIG. 3 is a flowchart of a motor failure detecting method using a position sensor according to an embodiment of the present disclosure.

Referring to FIG. 3, signals related to a position of a motor are output from a plurality of position sensors 110 (S10). Here, each of the plurality of position sensors 110 may detect a rotary position of the motor that rotates according to rotation of a steering wheel and output the detected position of the motor as a signal according to a phase.

Then, the failure detector 130 detects whether all of the signals related to the position of the motor which have been output from the position sensors 110 indicate that the motor is stuck (S20).

Here, when all of the signals related to the position of the motor which have been output from the plurality of position sensors 110 indicate that the motor is stuck, the position of the motor according to rotation of the steering wheel cannot be detected, and accordingly, whether the motor has failed cannot be detected.

Then, unless all of the signals related to the position of the motor which have been output from the position sensors 110 indicate that the motor is stuck, the failure detector 130 detects whether the motor has failed by using measurement values of the position sensors 110 (S30). Here, the failure detector 130 may detect whether the motor has failed by detecting a speed of rotation, an angle of rotation, and the like of the motor from the signals related to the position of the motor which have been output from the plurality of position sensors 110. In this case, when one of the plurality of position sensors 110 has detected that the motor is stuck, the failure detector 130 may detect the position sensor 110 which has detected that the motor is stuck as an error and may detect whether the motor has failed by using the position sensor 110 which has not detected that the motor is stuck.

Meanwhile, when all of the signals related to the position of the motor which have been output from the position sensors 110 indicate that the motor is stuck, the failure detector 130 detects whether the motor has failed by using measurement values of the torque sensor 120 (S40).

Here, when all of the signals related to the position of the motor which have been output from the position sensors 110 indicate that the motor is stuck, the failure detector 130 may detect whether the motor has failed on the basis of a variation of the torque of the motor detected by the torque sensor 120 and whether a vehicle moves according to the variation of the torque.

Figure 4:
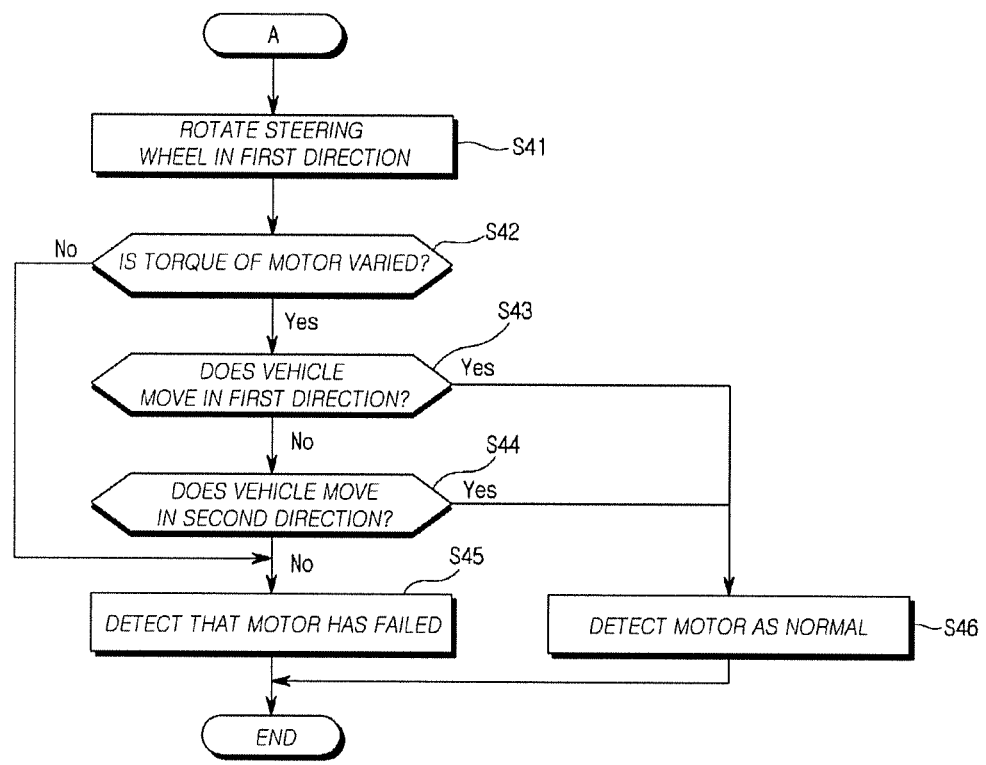
FIG. 4 is a flowchart of a motor failure detecting method using a torque sensor according to an embodiment of the present disclosure.

FIG. 4 is a flowchart of a motor failure detecting method using a torque sensor according to an embodiment of the present disclosure.

Referring to FIG. 4, when all of signals related to a position of a motor which have been output from a plurality of position sensors indicate that the motor is stuck, a steering wheel is rotated in a first direction (S41). Here, when the steering wheel is rotated in the first direction, the torque of the motor may be varied, and the torque sensor 120 may detect the varied torque of the motor.

Then, the failure detector 130 detects whether the torque of the motor has been varied (S42).

In this case, when the torque of the motor is not varied, the failure detector 130 detects that that motor has failed (S45). Specifically, since the torque of the motor is not varied unless the motor rotates according to rotation of the steering wheel, the failure detector 130 may detect that the motor has failed.

When the torque of the motor is varied, the failure detector 130 detects whether a vehicle moves in the first direction (S43). Specifically, when a variation of the torque of the motor is sensed, this may be due to the motor rotating according to rotation of the steering wheel, but the motor may also rotate regardless of the rotation of the steering wheel due to a failure of the motor in some cases. Thus, the failure detector 130 may detect whether the vehicle moves in the first direction and detect whether the vehicle normally moves according to operation of the steering wheel.

Here, when the vehicle moves in the first direction, the failure detector 130 detects the motor as normal (S46). Specifically, when the vehicle moves in the first direction, the failure detector 130 may detect that the vehicle has normally moved in the direction of rotation of the steering wheel and detect the motor as normal.

Meanwhile, when the vehicle does not move in the first direction, the failure detector 130 detects whether the vehicle moves in a second direction (S44). Specifically, even if the motor is normal, the vehicle may not move in the first direction due to an obstacle or the like in some cases. Thus, the failure detector 130 may detect whether the vehicle moves in the second direction and detect whether the vehicle has not moved in the first direction due to an obstacle or the like or the failure of the motor. In this case, the steering wheel may be rotated in the second direction so that the vehicle moves in the second direction.

Then, when the vehicle moves in the second direction, the failure detector 130 may detect the motor as normal (S46). Specifically, when the vehicle moves in the second direction, the failure detector 130 may detect that the vehicle has normally moved in the direction of rotation of the steering wheel and detect the motor as normal.

Meanwhile, when the vehicle does not move in the second direction, the failure detector 130 detects that the motor has failed (S45). Specifically, when the vehicle does not move in the second direction, the failure detector 130 may detect that the vehicle has not normally moved in the direction of rotation of the steering wheel and detect that the motor has failed.

In this case, the controller 140 may cut off the power supply of the vehicle and release the stuck motor, and the driver may stop the vehicle at a safe location using the remaining power.

As described above, the present disclosure may realize an apparatus and method for detecting a motor failure capable of detecting a motor failure using a position sensor and, when a motor failure is not detected using the position sensor, detecting a motor failure using a torque sensor.

The apparatus and method for detecting a motor failure according to an embodiment of the present disclosure can detect a motor failure.

In addition, since there is a problem in that whether a motor has failed cannot be checked when all of signals that result from measurement of a state of the motor by a plurality of motor position sensors indicate that the motor is stuck, in such a case, whether the motor has failed can be detected by detecting a variation of torque applied to the motor by using a torque sensor.

In addition, by detecting a motor failure, it is possible to secure safety of a driver.

Features and advantages of the present disclosure other than the above may be newly grasped from the embodiments of the present disclosure.

Those of ordinary skill in the art to which the present disclosure pertains should be able to practice the present disclosure in other specific forms without changing the technical idea or essential features of the present disclosure. Therefore, the above-described embodiments should be understood as illustrative, instead of limiting, in all aspects. The scope of the present disclosure is represented by the claims below rather than the detailed description given above, and all changes or modifications derived from the meaning and scope of the claims and their equivalents should be interpreted as belonging to the scope of the present disclosure.

What is claimed is:

1. An apparatus for detecting a motor failure, the apparatus comprising:
a plurality of position sensors each configured to output signals related to a position of a motor;
a torque sensor configured to detect a torque of the motor according to rotation of a steering wheel; and
a controller configured to, when all of the signals related to the position of the motor which have been output from the plurality of position sensors indicate that the motor is stuck, detect whether the motor has failed by using a variation of the torque of the motor,
wherein the plurality of position sensors are mounted on different positions of the motor, sense rotation of a magnet mounted on a rotor of the motor, and output signals related to the position of the motor.

2. The apparatus of claim 1, wherein, when some of the signals related to the position of the motor which have been output from the plurality of position sensors indicate that the motor is stuck, the controller detects the position sensor which has detected that the motor is stuck as an error and detects whether the motor has failed by using the position sensor which has not detected that the motor is stuck.

3. The apparatus of claim 1, wherein, when all of the signals related to the position of the motor which have been output from the plurality of position sensors indicate that the motor is stuck, the controller changes steering of a vehicle clockwise or counterclockwise, detects whether the vehicle has moved according to the variation of the torque of the motor and a variation of the steering, and detects whether the motor is stuck.

4. The apparatus of claim 1, wherein, when all of the signals related to the position of the motor which have been output from the plurality of position sensors indicate that the motor is stuck, the controller rotates the steering wheel in a first direction and senses the variation of the torque of the motor.

5. The apparatus of claim 4, wherein, when the variation of the torque of the motor is not sensed, the controller detects that the motor has failed, and when the variation of the torque of the motor is sensed, the controller detects whether a vehicle moves in the first direction.

6. The apparatus of claim 5, wherein, when the vehicle moves in the first direction, the controller detects the motor as normal, and when the vehicle does not move in the first direction, the controller rotates the steering wheel in a second direction which is opposite the first direction and detects whether the vehicle moves in the second direction.

7. The apparatus of claim 6, wherein, when the vehicle moves in the second direction, the controller detects the motor as normal, and when the vehicle does not move in the second direction, the controller detects that the motor has failed.

8. The apparatus of claim 1, the controller is further configured to control a vehicle on the basis of detection,
wherein, when the motor failure is detected, the controller cuts off a power supply of the vehicle.

9. A method for detecting a motor failure, the method comprising:
- outputting signals related to a position of a motor by using a plurality of position sensors;
- detecting whether all of the signals related to the position of the motor indicate that the motor is stuck; and
- detecting whether the motor has failed on the basis of a variation of steering and a variation of a torque of the motor detected by a torque sensor,
- wherein the outputting signals related to a position of a motor includes:
  - sensing rotation of a magnet mounted on a rotor of the motor by using the plurality of position sensors mounted on different positions of the motor, and
  - outputting the signals related to the position of the motor on the basis of the sensed rotation of the magnet.

10. The method of claim 9, further comprising, when all of the signals related to the position of the motor indicate that the motor is stuck after the detecting whether the motor has failed;
- changing steering of a vehicle, and
- detecting the variation of the torque of the motor.

11. The method of claim 10, wherein the detecting whether the motor has failed includes:
- rotating a steering wheel in a first direction, and
- detecting whether the torque of the motor is varied.

12. The method of claim 11, further comprising, after the detecting whether the motor has failed:
- when the torque of the motor is not varied, determining the motor as having failed, and
- when the torque of the motor is varied, detecting whether the vehicle moves in the first direction and determining the motor as normal when the vehicle moves in the first direction.

13. The method of claim 12, wherein, when the vehicle does not move in the first direction after rotating the steering wheel in the first direction,
- rotating the steering wheel in a second direction which is opposite the first direction, and
- detecting whether the vehicle moves in the second direction.

14. The method of claim 13, wherein, in the detecting whether the motor has failed, the motor is detected as normal when the vehicle moves in the second direction, and the motor is detected as having failed when the vehicle does not move in the second direction.

15. The method of claim 9, wherein, when the motor is detected as normal, controlling a vehicle such that the vehicle keeps traveling according to instructions of a driver.

16. The method of claim 9, further comprising, when the motor is detected as having failed, cutting off a power supply of a vehicle.

* * * * *